C. H. MANN.
Cattle Stanchion.
No. 68,372. Patented Sept. 3, 1867.
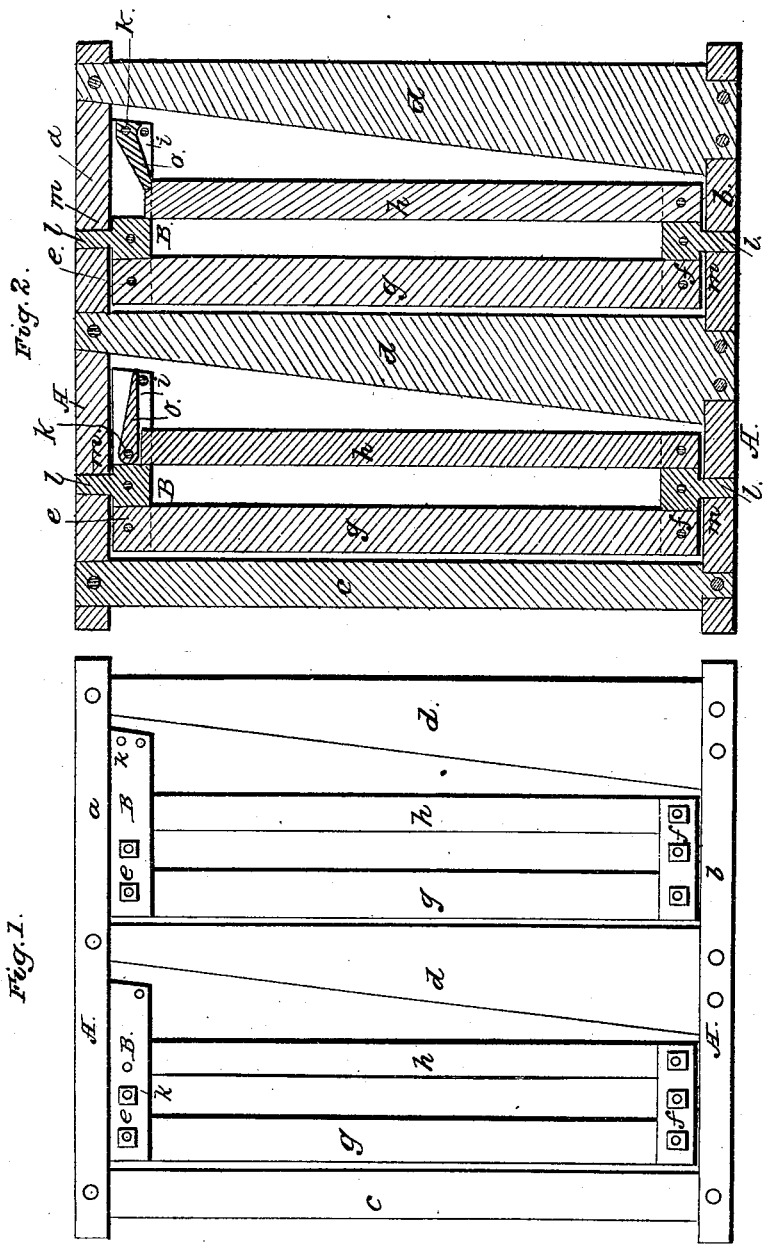

United States Patent Office.

CHARLES H. MANN, OF FAIRLEE, VERMONT.

Letters Patent No. 68,372, dated September 3, 1867.

---

IMPROVEMENT IN CATTLE-STANCHIONS.

---

*The Schedule referred to in these Letters Patent and making part of the same.*

---

TO ALL PERSONS TO WHOM THESE PRESENTS SHALL COME:

Be it known that I, CHARLES H. MANN, of Fairlee, in the county of Orange, and State of Vermont, have invented a new and useful or an improved Cattle-Stanchion; and do hereby declare the same to be fully described in the following specification, and represented in the accompanying drawings, of which—

Figure 1 is a side elevation, and

Figure 2 a longitudinal section of two of such stanchions with their supporting frame.

My invention is a rotary stanchion, capable of turning laterally on journals, in order that it may be adjustable to an ox, or animal whose neck may be within it, and while he may be lying down or turning his head or neck.

In the drawings, A denotes the supporting frame of the stanchions, it being formed of two horizontal step-timbers, $a\ b$, and certain connecting upright planks, $c\ d\ d$. Each of the said planks $d$ has one edge perpendicular and the other inclined to the bed-timber, in manner as represented. One of the stanchions B B is arranged between each two of the said planks $c\ d\ d$, in manner as exhibited in the drawings, such stanchion being composed of two horizontal bars, $e\ f$, a connection-bar, $g$, and a movable bar, $h$. The movable bar is hinged or jointed to the lower bar $f$, and enters a slot, $i$, formed in the upper bar $e$. A pawl, $o$, arranged in the slot $i$, and on a centre pin, $k$, serves to hold the bar $h$ in parallelism with the upright bar $g$.

By raising the pawl the bar $h$ may be moved so as to admit the head of an animal into the stanchion, or enable it to be removed therefrom. The stanchion so constructed is provided with two journals, $l\ l$, one projecting upward from its bar, $e$, and the other being extended downward from the bar $f$. These journals enter bearings $m\ m$, made in the step-timbers $a\ b$, and they admit of the stanchion being revolved or turned laterally.

I claim the rotary stanchion, as well as its arrangement and combination with a holding frame, or its equivalent, the whole being substantially as described.

CHAS. H. MANN.

Witnesses:
 GEO. W. BROWN,
 JOHN STRATTON.